Sept. 20, 1960          I. BATT          2,953,662
COMMUTATING AND SPEED CONTROL SWITCH MEANS
Filed April 29, 1958          2 Sheets-Sheet 1
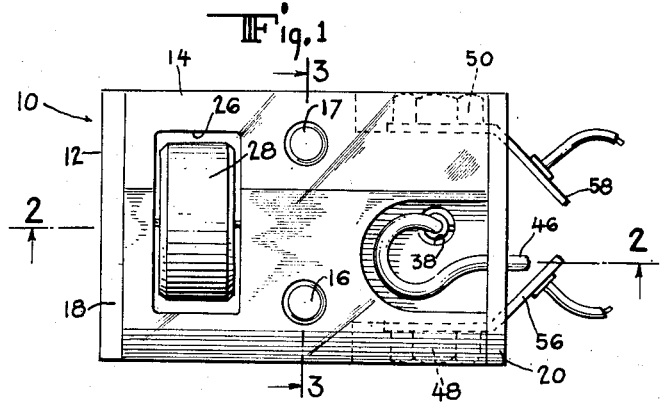
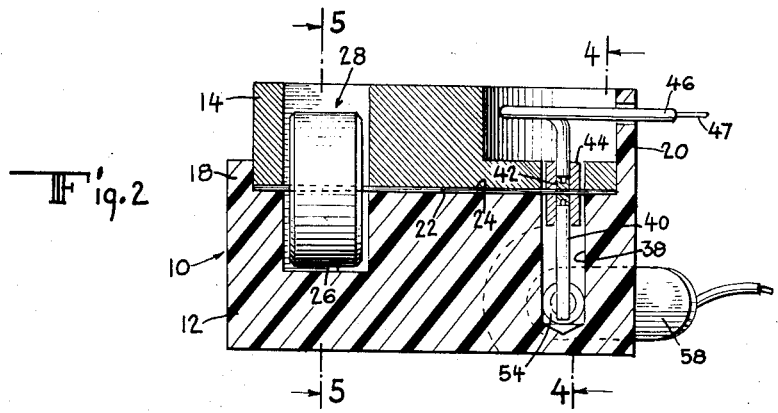
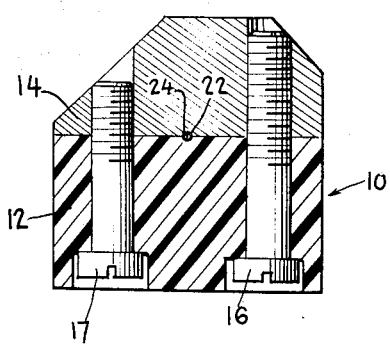
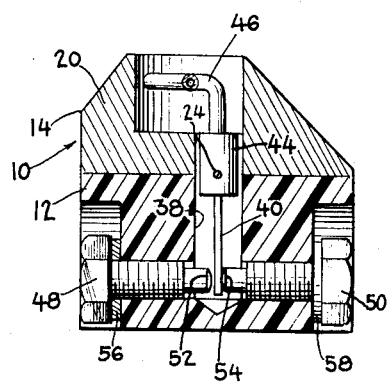
INVENTOR
Ira Batt
BY
AGENT Sept. 20, 1960  I. BATT  2,953,662
COMMUTATING AND SPEED CONTROL SWITCH MEANS
Filed April 29, 1958  2 Sheets-Sheet 2
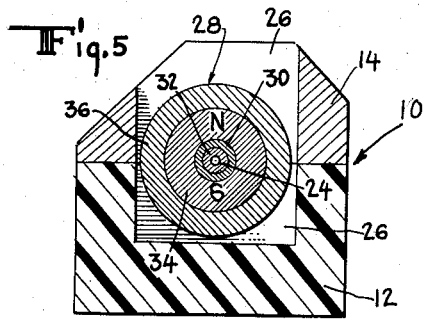
Fig.5
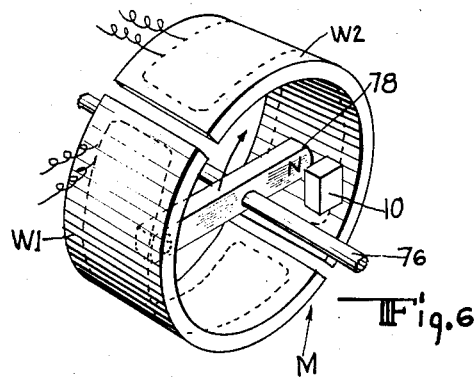
Fig.6
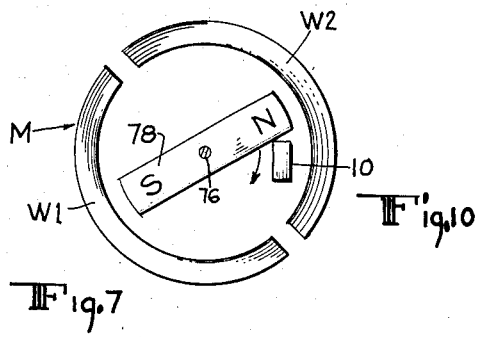
Fig.7
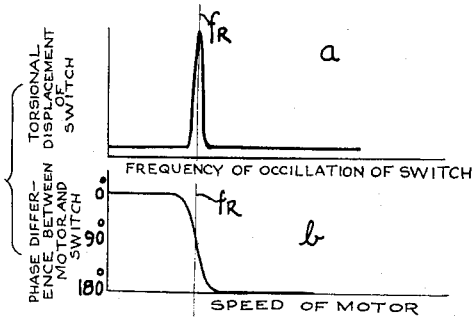
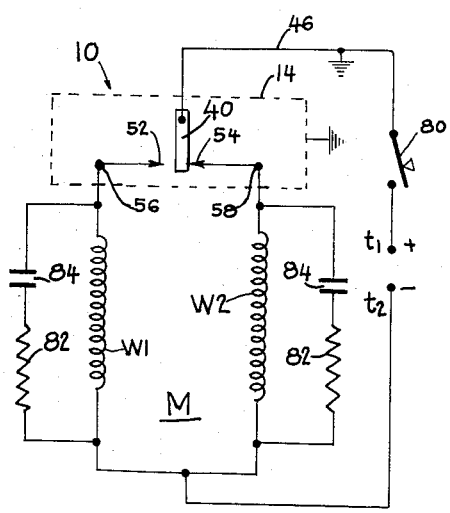
Fig.8
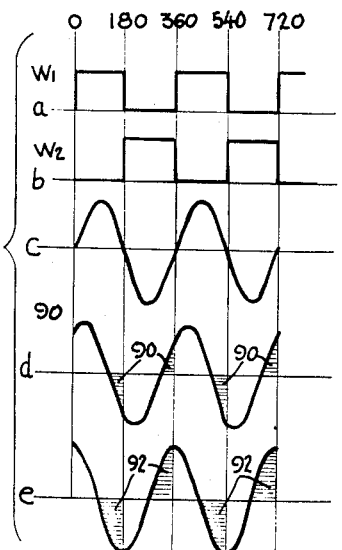
Fig.9
INVENTOR
Ira Batt
BY
AGENT

United States Patent Office 2,953,662
Patented Sept. 20, 1960

2,953,662

COMMUTATING AND SPEED CONTROL SWITCH MEANS

Ira Batt, Dumont, N.J., assignor to ACF Industries, Incorporated, New York, N.Y., a corporation of New Jersey Filed Apr. 29, 1958, Ser. No. 731,713

10 Claims. (Cl. 200—91)

This invention relates to commutating and speed control switch means for electric motors and more particularly to magnetically operated switch means adapted to control the operation of electric motors and other electrical devices. In driving certain devices or apparatus by means of electric motors, it is often desirable to maintain a substantially constant predetermined speed, which is not responsive to changes in load or voltage. While some types of alternating current motors, such as synchronous motors driven from a constant frequency power source, maintain a substantially constant speed, the speed of such motors cannot be changed at will. Thus, direct current operation of a motor lends itself to more practical operation.

One type of direct current magnetically operated switch has a resilient control rod which is fixed at one or both ends. The resilient control rod opens and closes the switch when torsionally displaced. At high frequencies of oscillation, the resilient rod will tend to oscillate at its resonant frequency. This type of switch requires relatively large forces for making contact to start a motor. Also such a switch is subject to breakage when resonance is reached. In order to operate switches of this type, it has also been conventional to employ a flipper switch to bring a motor up to full speed, at which point a resonant switch would become active.

It is, therefore, an object of the present invention to provide a novel switch means adapted to operate an electric motor at a substantially constant predetermined speed.

Another object of the invention is to provide a novel switch means adapted to operate an electric motor at a substantially constant speed from a source of direct current.

A further object of the invention is to provide a novel constant speed motor and switch means arrangement which is not affected by changes in voltage or load.

Another object of the invention is to provide a magnetically operated switch arrangement using a resonant structural assembly which includes a resilient wire, which switch arrangement requires a small operating force at low speeds, and operates both as a flipper switch at low speeds and a resonant switch at high speeds.

Fig. 1 is a top plan view illustrating a novel switch structure in accordance with the invention;

Fig. 2 is a longitudinal sectional view taken along the line 2—2 of Fig. 1;

Fig. 3 is a transverse sectional view taken along the line 3—3 of Fig. 1;

Fig. 4 is a transverse view, in section taken along the line 4—4 of Fig. 2;

Fig. 5 is a transverse sectional view of the invention device taken along line 5—5 of Fig. 2;

Fig. 6 is a schematic perspective view illustrating the arrangement of the switch structure of Figs. 1 through 5 with elements of an electric motor;

Fig. 7 is an end view of the arrangement of Fig. 6;

Fig. 8 is a wiring diagram including the switch and electric motor of Figs. 1 through 7;

Figs. 9 and 10 are graphic representations of different operating conditions of the motor and switch of Figs. 1 through 7.

Referring now to Figs. 1 through 4, the novel, magnetically operated switch 10 is shown comprising a base 12 and a cover 14. The base 12 is moulded from a suitable electrical insulating thermosetting plastic material, such as a phenolic resin. The cover 14 is cast from non-magnetic material, such as aluminum. The cover 14 is secured to the base 12 by means of cap screws 16 and 17, respectively, which extend through openings in the base for engagement in threaded apertures provided in the cover (Fig. 3). The cover 14 snugly fits between end walls 18 and 20 of the base 12.

A longitudinally extending groove 22 is formed in the inner surface of the cover 14. A torsion member 24, formed of resilient spring steel, such as piano wire of slightly smaller diameter than groove 22 is housed within groove 22 and rests on the top surface of base 12, which provides a bearing surface for rotational movement. To prevent axial movement of the torsion member 24, the ends of the wire 24 are disposed in abutting engagement against the end walls 18 and 20 of the base 12.

The switch housing 10 is formed with a cavity 26 at one end, extending through the cover 14 into the base 12, to receive a cylindrical magnet assembly 28 fixedly secured to the torsion member 24. As illustrated in Fig. 5, the magnet assembly 28 includes a brass bushing 30 sleeved over and soldered, as at 32, to the wire torsion member 24. An anular magnetic member 34, formed of a material having a relatively high magnetic retentivity, is press-fitted onto the brass bushing. To provide the magnetic assembly with greater inertia, a ring of brass 36, or other non-magnetic material, is press-fitted onto the annular magnetic member 34.

A bore 38 is formed in the base 12, at the other end of the base 12 from cavity 26 and receives a contact bar or a rod 40 soldered at 42 at its upper end into a metal sleeve 44. An insulated electrical conductor 46 is inserted into the upper end of the metal sleeve 44 and has its wire 47 soldered thereto at 42. The solder at 42 also serves to fix sleeve 44 to the torsion wire 24, which is supported for rotational movement by wire 24.

Stationary contact members, mounted in the base 12 on opposite sides of the contact bar 40 respectively comprise studs 48 and 50, threaded into the base 12. The inner ends of studs 48 and 50 form contact points 52 and 54, respectively, for alternate engagement by the rod 40 during reciprocation of the torsion wire 24. A pair of metal terminals 56 and 58 are fixed and clamped to base 12 by the threaded studs 48 and 50, respectively.

When the switch 10 is positioned in an external magnetic field, the poles of the magnet 34 will tend to align the magnetic axis thereof with the magnetic lines of the external field. This action will rotate the wire torsion member 24 and move the contact bar 40 into engagement with one of the stationary contacts 52 or 54. When the direction of the flux lines of the external magnetic field is reversed, the magnet 34 will rotate the wire torsion member 24 in the opposite direction and move the contact bar 40 into engagement with the other of said stationary contacts 52 and 54. The switch 10 is thus adapted for use as a magnetically operated circuit-making-and-breaking device.

The switch 10, may be used in controlling the frequency of an audio amplifier, or for regulating the speed of an electro-dynamic machine, such as a direct current self-synchronizing motor, either directly or through a suitable amplifier.

Such a directly regulated current motor M is shown schematically in Figs. 6 and 7 wherein $W_1$ and $W_2$ designate two stator field coil windings. The stator windings $W_1$ and $W_2$ each consists of a coil wound as indicated by the dotted lines, so that each coil is bent in an annular configuration to enclose roughly half of the rotational path of a rotor magnet 78. The motor rotor includes a shaft 76, which carries a magnetic field producing structure, schematically shown as a simple permanent bar magnet 78. It is understood that other types of permanent magnets or electromagnets can also be used in place of the bar magnet 78.

An oscillatory switch 10, similar to that described above relative to Figs. 1 through 5, is positioned, as is shown in Figs. 6 and 7, within the rotating magnetic field accompanying the rotor magnet 78. When the rotor magnet 78 takes a position as shown in Figs. 6 and 7, for example, the magnet 34 of switch 10 will attempt to align its poles along the field lines of magnet 78. However, rotation of the magnet assembly 28 is limited by rod 40 striking either terminal 52 or 54, depending upon the direction of rotation of the magnet assembly 28. At high speeds, the amount of rotation of the magnet assembly 28 is determined by its angular momentum and the torsional resistance of the portion of wire 24 between the magnet assembly 28 and sleeve 44. Each time rotor magnet 78 moves 180°, magnet 34 is reversed in direction and rotates wire 24 in the opposite direction until rod 40 strikes the other terminal 52 or 54. It will be understood that the above-mentioned 180° are electrical degrees, which correspond to the mechanical degrees of rotation of rotor 78 only in the simple case of the two-pole rotor, shown.

The electrical connections between the switch 10 and the motor windings $W_1$ and $W_2$ are shown in the wiring diagram of Fig. 8, wherein the terminals $t_1$ and $t_2$ are the output terminals of a conventional direct power source (not shown). The terminal $t_2$ is connected to one end of each of the windings $W_1$ and $W_2$. The terminal $t_1$ is connected through the conductor 46 to the contact arm 40, which is at the ground potential of the switch cover 14. The contacts 52 and 54 are connected through terminals 56 and 58, respectively, to the other ends of the windings $W_1$ and $W_2$ so that the windings may be alternately energized, depending upon which one of the switch contacts 52 and 54 is engaged by the contact bar 40. A resistor 82 and a condenser 84 connected in series with each other are connected respectively across each of the field windings $W_1$ and $W_2$ to provide spark suppression between contacts 52 and 54 and switch arm 40.

If the windings $W_1$ and $W_2$ are positioned as indicated in Figs. 6 and 7, and switch rod 40 is in contact with switch contact 54 (Fig. 8), then it may be assumed that the current passing through coil $W_2$ establishes a south pole at the inner center portion of coil $W_2$ in its position of Figs. 6 and 7. The north pole of rotor magnet 78 will then be attracted toward this south pole of coil $W_2$ and rotor 78 will move clockwise to bring its north pole N adjacent to the south pole at the center of coil $W_2$. As the rotor is thus moved into the position illustrated in Figs. 6 and 7, the south pole of the switch magnetic assembly 28 is attracted by the north pole of the rotor. The wire torsion member 24 is rotated by the movement of the magnetic assembly 28, and brings contact bar 40 to its alternate position against contact 52. This interrupts the circuit to the winding $W_2$ and the alternate circuit is established to energize the winding $W_1$ such that a south magnetic pole is now established at the inner center portion of the winding $W_1$. The south pole of the rotor magnet 78 is now repelled by this south pole of $W_1$ so that the rotor continues its clockwise motion and moves into a position 180° from the position shown in Fig. 7. This second movement of motor magnet 78 brings the south pole of the rotor 78 adjacent to the switch 10 attracting the north pole of the magnetic assembly 28 of the switch 10 and thereby changing the position of bar contact 40 into contact with terminal 54, again. The resulting switching action again energizes the winding $W_2$ to repeat the cycle of operation, as described.

In a successfully operated switch constructed in the manner described above, the torsion member 24 consists of a wire substantially ½ inch long and of 10 mils in diameter. The magnet assembly 28 is a solid cylinder of 350 mils in diameter and 150 mils thick. In operation, since the torsion member 22 is freely journaled between the cap 14 and the top surface of the dielectric block 10, the magnet assembly 28 supported on the torsion member 24 is free to rotate to position the contact bar 40 against either of the contact points 52 or 54. Since the spacing between contact points 52 and 54 is so small, it is very unlikely that the contact bar 40 would remain at dead center between these contact points and not be in contact with either of the points 52 or 54. Normally, there is sufficient ambient magnetic field around the magnet assembly 28 as to cause it to take a position such that the contact bar 40 in a state of rest will remain against one of the contact points 52 or 54. However, to always provide a positive contact between bar 40 and one of the contact points 52 or 54, when the switch is not being operated and so that it may become operable when current is passed into the windings $W_1$ and $W_2$, a small permanent magnet may be affixed within the switch casing so as to provide a predetermined position of the magnet assembly 28 such that bar 40 will remain in contact with one of the points 52 or 54, during times when the switch is not in operation.

To operate the combined switch and motor assembly, a switch 80 may be used in the circuit of Fig. 8 to initiate the operation of the device. Upon closing switch 80 and with the contact bar 40 in contact with one of the points 52 or 54, as shown in Fig. 8, current will flow through coil $W_2$ and set the motor-switch combination into operation.

At slow speeds the switch magnet assembly 58 merely operates as a commutator to alternately activate coil windings $W_1$ and $W_2$. However, the magnet switch assembly 28 is operated as each pole of rotor magnet 78, in turn, approaches the switch 10 in its position shown in Figs. 6 and 7. This has the effect of providing a continuous pull or attraction between the rotor magnet 78 and the two windings $W_1$ and $W_2$, alternately, which gives an acceleration to rotor 78. As the speed of the motor M increases, so will the frequency of alternation of the magnet switch. As the switch is operated faster and faster, the momentum or inertia of the magnet assembly 28 begins to play a part, since as the rotation of the switch magnet assembly 28 brings the contact bar 40 alternately into contact with the stop pins 56 and 58, the inertia of the magnet wheel 28 will impart a twist or strain on the wire 24 between the magnet wheel 28 and the point to which the contact bar 40 is attached to wire 22. This torsional strain stores energy in the wire, which is released, as the magnet wheel reverses its direction, and imparts itself to the rotation of the magnet to increase its inertia in the opposite direction.

The speed of motor M and the frequency of alternation of the magnet switch 10 will increase to a point where the magnet switch obtains a resonant frequency. As the switch magnet assembly reaches this resonant frequency, the magnet assembly has a tendency to remain at the resonant frequency. During the acceleration of the motor and the switch to the resonant frequency, both the motor and switch are in phase with each other.

Figure 9 indicates in several of the curves the condition of the motor-switch assembly during this preliminary operation. Fig. 9–$a$ is a graph of the current flowing through coil $W_1$, for example, during the rotation of the motor rotor 78. Fig. 9–$b$ is a graph of the current flowing through coil $W_2$ during the same period of time. The curves $a$ and $b$ of Fig. 9 are out of phase because of the alternate activation of coils $W_1$ and $W_2$. The curve of Fig. 9–$c$ is a simple sine wave and indicates the in-phase relationship of both the motor and the switch, when they have obtained the resonant frequency of the switch assembly. However, if at this point the speed of the motor tends to further increase beyond the resonant frequency, while the switch continues to operate at resonant frequency, the phase between the motor and the switch will change from the in-phase condition to an out-of-phase condition, in which the switch assembly will begin to lag behind the motor. Fig. 9–$d$ illustrates such a condition. If the curve of Fig. 9–$d$ represents the operation of the switch assembly at reasonant frequency and Fig. 9–$c$ represents the motor M, it can be seen by comparing the two curves that there is a lag in the operation of the switch assembly relative to the operation of the motor. That is, the switch is out-of-phase with the motor by an amount indicated in Fig. 9–$d$ by the shaded areas. During these out-of-phase periods, the motor runs into a retarding force since the switch has failed to change over and the stator coils $W_1$ and $W_2$ alternately provide a decelerating field. However, the curve of Fig. 9–$d$ indicates that for a large part of each cycle or half cycle of motor operation, the motor and switch are in phase and the motor is at these times being accelerated. This acceleration of the motor is of greater magnitude than the deceleration indicated by the shaded areas 90.

It is possible for the motor to keep accelerating to a greater speed beyond the resonant frequency, particularly if the motor is driven by its load. Fig. 9–$e$ indicates greater areas 92, in which the motor is out-of-phase with the switch and the time of motor deceleration is as great as motor acceleration. In such a condition the work load could be driving the motor while the net effect of the coils $W_1$ and $W_2$ on rotor 78 is substantially zero. However, in spite of such a condition, if the speed of the motor continues to increase for any reason, the motor and switch will become more out of phase than the balanced condition illustrated by the curve of Fig. 9–$e$ and the stator coils $W_1$ and $W_2$ will now exert a braking force on the rotor 78 such that the switch now attempts to run the motor backward. This condition will tend to reduce the speed of the motor.

Fig. 10 further illustrates the operation of the motor and switch. Curve $a$ of Fig. 10 illustrates the amount of angular torsional twisting or displacement of the rod 24 of the switch assembly relative to the frequency of oscillation of the magnet assembly 28. As set forth above, the movement of switch rod 40 back and forth against the points 52 and 54 at low frequency of switch operation causes a very small, negligible twisting of the wire 24. This amounts to substantially a torsional displacement of around 1/10 of 1°. However, at resonant frequency the inertia of the switch assembly builds up to such a degree that the torsional twisting or displacement of wire 24 becomes very great as graphically illustrated in the curve of Fig. 10–$a$, in which $f_R$ represents the resonant frequency of the switch.

Fig. 10–$b$ is another graphic illustration of the phase difference between the motor and switch assembly. This curve illustrates again that at low speeds, below the resonant frequency $f_R$, both the switch and motor are in phase, but when the switch reaches resonant frequency, the phase difference changes quickly and during a small change in the speed of the motor. It is this characteristic of the present motor-switch combination that provides a control for the motor which holds the speed of the motor at a fixed point corresponding to that of the resonant frequency of the switch.

Thus, if the motor speed tends to increase above that corresponding to the resonant frequency of the switch, the large change in phase between the switch and motor almost immediately supplies a retarding force to the motor, in the manner described above, which brings the motor back to speed corresponding to resonant frequency of the switch. In a like manner, any increase in the load of the motor, which tends to slow the speed of the motor down will very quickly shift the phase difference between the switch and motor in the direction of zero phase difference. This permits the application of full driving power to the motor. Because of these operating characteristics of this motor-switch combination, there is effectively produced a motor which will operate at substantially constant speed under varying degrees of operation. The operation of the switch at resonant frequency is unrelated to the voltage supplied to stator windings $W_1$ and $W_2$. Thus, changes in current flow through windings $W_1$ and $W_2$, which tend to change the speed of rotor 78 will be compensated for by changes in the phase relationship between the motor and switch, in the manner described above, to maintain the motor at constant speed.

The resonant frequency of the magnet switch assembly can be expressed $$f_R = \frac{1}{2\pi}\sqrt{\frac{K}{I}}$$

where K is the spring constant of the wire 24 and I is the momentum of inertia of the magnet assembly 28. The controlled speed of the motor can be varied by changing either of the values of K or I or both such as by the use of torsion wires 24 having a different coefficient of elasticity, or a magnet assembly 28 of different mass. These values can be adjusted to provide the desired frequency of operation, such as 60 cycles per second, for example.

An advantage of the invention, as set forth above, is the fact that the magnet switch assembly 28 can rotate freely in either direction. This permits the use of very small forces to set the switch in motion from a stationary position. In its operation, the switch changes from a flip-flop type at low speeds to a resonant switch at high speeds. If the torsion wire 24 were fixed at its ends to the switch mounting, it would be necessary first to overcome the torsional forces of the wire 24 in order to start the motor M in operation. This is a disadvantage, since larger starting forces are required, requiring a stronger magnet 78, which when the switch reaches resonant frequency, will greatly increase the torsional displacement of the spring to a point where the spring 24 will break. The novel switch described above, thus, is one which is less critical in operation, more sensitive to starting forces and provides a more rugged and lasting structure.

The oscillating characteristics of the switch are not limited to its application in controlling the speed of an electrodynamic machine, but can be readily adapted to other uses, where frequency control is required, such as the replacement for a tuning fork or for the cantilever vibrator element of a converter circuit.

I claim:

1. A magnetically operated switch comprising a support, an elongated torsion spring mounted on said support for free rotation about its longitudinal axis, a magnet means fixed to said torsion spring, a pair of electrical contact elements mounted in spaced relationship on said support, and a contact arm fixed to said torsion spring, said contact arm having a portion thereof extending between said contact elements.

2. A magnetically operated switch comprising a support, an elongated torsion spring, means mounting said torsion spring on said support for free rotation about its longitudinal axis, a magnet means fixed to said torsion spring, a pair of electrical contact elements mounted in spaced relationship on said support, and a contact arm fixed to said torsion spring at a point spaced from said magnet means, said contact arm having a portion thereof extending between said contact elements.

3. A magnetically operated switch comprising a support, an elongated torsion spring rod, means freely mounting the ends of said spring rod on said support for rotation about its longitudinal axis, a magnet fixed to said torsion spring and intermediate said ends thereof, a pair of electrical contact elements mounted in spaced relationship on said support, and a contact arm fixed to said torsion spring intermediate said ends thereof and spaced from said magnet, said contact arm having a portion thereof extending between said contact elements to sequentially make contact with said contact elements and to limit rotation of said spring rod.

4. A switch adapted to be operated by an external magnetic force, said switch comprising a support, an elongated torsion spring rod, means journaling said torsion spring rod on said support for free rotation about the longitudinal axis of said spring rod, a magnet fixed at its center to one end portion of said torsion spring rod, and an electrical contact arm adapted to be connected into an electrical circuit and fixed to the other end portion of said torsion spring rod, a pair of electrical contacts fixed in spaced relationship to said support, one end of said contact arm extending between said contact elements and adapted to move into contact with said contact elements alternately.

5. A switch adapted to be operated by an external magnetic force, said switch comprising a support, an elongated torsion spring rod, means journaling both ends of said torsion spring rod on said support for free rotation about the longitudinal axis of said spring rod, a magnet fixed adjacent to one of said ends of said torsion spring rod, and an electrical contact arm adapted to be connected into an electrical circuit and fixed adjacent to the other one of said ends of said torsion spring rod, a pair of electrical contacts fixed to said support with a small space therebetween, one end of said contact arm extending between said contact elements into said small space and adapted to move into contact with said contact elements alternately whereby said arm may sequentially make contact with said contact elements and limit rotation of said spring rod.

6. A switch comprising a support, a magnet torsional assembly including an elongated torsion spring rod, means journaling said torsion spring rod on said support at both ends and at an intermediate portion of said spring rod for free rotation of said spring rod about the longitudinal axis thereof, a permanent magnet fixed adjacent to one of said ends of said torsion spring rod, and between said one end and said intermediate portion of said spring rod, and an electrical contact arm adapted to be connected into an electrical circuit and fixed adjacent to the other one of said ends of said torsion spring rod and between said other end and said intermediate portion of said torsion spring rod, a pair of electrical contacts fixed in closely spaced relationship to said support, one end of said contact arm extending between said contact elements and adapted to move into contact with said contact elements alternately to sequentially connect said contact elements into said electrical circuit, and means for supplying a magnetic field of alternating polarity adjacent to said magnet to rotate said magnet torsional assembly alternately in opposite directions at the resonant frequency of said magnet torsional assembly.

7. A magnetically operated switch for a regulating switching frequency comprising: a support; an elongated torsion spring rod; magnet means fixed to said spring rod; an electrical contact arm spaced from said magnet and fixed to said spring rod, said magnet, spring rod, and contact arm assembly being of such configuration that its torsional resonant frequency is the regulating switching frequency; means for limiting rotation of said spring rod, and a pair of electrical contacts fixed in spaced relationship to said support and arranged to sequentially make contact with said contact arm.

8. A magnetically operated switch for a regulating switching frequency comprising: a support; an elongated torsion spring rod; magnet means fixed to said spring rod; an electrical contact arm spaced from said magnet and fixed to said spring rod, said magnet, spring rod, and contact arm assembly being of such configuration that its torsional resonant frequency is the regulating switching frequency; and a pair of electrical contacts fixed in spaced relationship to said support, so that one end of said contact arm extends between said contact elements and is adapted to move into contact with said contact elements alternately and thereby limit rotation of said spring rod.

9. A motor speed regulating switch for a motor having stator field coils and a rotor with fixed magnetic poles comprising: a support; a magnet torsional assembly including an elongated torsion spring rod, magnet means fixed to said spring rod, and an electrical contact arm spaced from said magnet means and fixed to said spring rod; means for limiting rotation of said magnet torsional assembly; a current source connected to said electrical contact arm; and a pair of electrical contacts fixed in spaced relationship to said support, each contact being connected to a stator field coil spaced 180 electrical degrees from the stator field coil to which the other contact is connected, and arranged to sequentially make contact with said contact arm whereby current is connected to the stator fields at a switching rate corresponding to the torsional resonant frequency of the magnet torsional assembly.

10. A motor speed regulating switch for a motor having stator field coils and a rotor with fixed magnetic poles comprising: a support; a magnet torsional assembly including an elongated torsion spring rod, magnet means fixed to said spring rod, and an electrical contact arm spaced from said magnet means and fixed to said spring rod; a current source connected to said electrical contact arm; and a pair of electrical contacts fixed in spaced relationship to said support, each contact being connected to a stator field coil spaced 180 electrical degrees from the stator field coil to which the other contact is connected and having one end of said contact arm extending between said contact elements and adapted to move into contact with said contact elements alternately and thereby limit rotation of said magnet torsional assembly whereby current is connected to the stator fields sequentially at a switching rate corresponding to the torsional resonant frequency of the magnet torsional assembly.

References Cited in the file of this patent
UNITED STATES PATENTS

| | | |
|---|---|---|
| 559,187 | Miller | Apr. 28, 1896 |
| 1,118,296 | Lutz | Nov. 24, 1914 |
| 1,190,923 | Lindquist | July 11, 1916 |
| 1,660,197 | Holte | Feb. 21, 1928 |
| 1,858,876 | Bossart | May 17, 1932 |
| 1,913,826 | Blosser | June 13, 1933 |
| 2,499,632 | Coake | Mar. 7, 1950 |
| 2,635,155 | Barr | Apr. 14, 1953 |
| 2,775,666 | Lazich | Dec. 25, 1956 |